United States Patent [19]

Sheriff

[11] Patent Number: 4,827,364
[45] Date of Patent: May 2, 1989

[54] SELF-COMPENSATING MEDIA CENTERING AND CLAMPING MECHANISM FOR FLOPPY DISK DRIVES

[75] Inventor: David R. Sheriff, Campbell, Calif.
[73] Assignee: Xerox Corporation, Stamford, Conn.
[21] Appl. No.: 605,328
[22] Filed: Apr. 30, 1984
[51] Int. Cl.⁴ .............................................. G11B 5/016
[52] U.S. Cl. .................. 360/99.05; 360/99.12
[58] Field of Search .................. 360/99, 97, 133, 135, 360/86; 369/261, 270

[56] References Cited

U.S. PATENT DOCUMENTS

| | | | |
|---|---|---|---|
| 3,643,240 | 2/1972 | Raiser | 206/303 X |
| 4,040,634 | 8/1977 | Leedom | 274/2 |
| 4,077,236 | 3/1978 | Dalziel | 64/22 |
| 4,125,883 | 11/1978 | Rolph | 360/99 |
| 4,151,573 | 4/1979 | Tandon | 360/104 |
| 4,193,101 | 3/1980 | Carlson | 360/97 |
| 4,218,065 | 8/1980 | Van der Hoek et al. | 274/9 |
| 4,326,227 | 4/1983 | Schlüter | 360/99 |
| 4,409,629 | 10/1983 | Puls | 360/99 |
| 4,413,294 | 11/1983 | Beijes | 360/99 |
| 4,430,678 | 2/1984 | Hack et al. | 360/99 |
| 4,466,033 | 8/1984 | Jordan et al. | 360/99 |
| 4,561,035 | 12/1985 | McDorman et al. | 360/97 X |

FOREIGN PATENT DOCUMENTS

| | | | |
|---|---|---|---|
| 59-30276 | 2/1984 | Japan | 360/135 |
| 59-82676 | 5/1984 | Japan | 360/135 |

OTHER PUBLICATIONS

Holecek et al., "Loading Collet For Flexible Disk", IBM Tech. Disc. Bull., vol. 21, No. 1, Jun. 1978.

*Primary Examiner*—John H. Wolff

[57] ABSTRACT

For centering and clamping a disk-like recording medium on the spindle of a floppy disk drive, there is an expandible collet comprising a plurality of flexible fingers which have generally tangentially extending arcurately profile ribs for clamping the disk against the spindle. Due to the flexibility of the fingers, the ribs have a substantially constant, line-like footprint, which enables them to apply a predetermined, essentially constant, normal clamping pressure to the recording medium, even if the collet is slighted tilted with respect to the spindle or if the mating surfaces of the collet and spindle are not absolutely parallel or perfectly flat.

4 Claims, 3 Drawing Sheets

SELF-COMPENSATING MEDIA CENTERING AND CLAMPING MECHANISM FOR FLOPPY DISK DRIVES

FIELD OF THE INVENTION

This invention relates to the media/spindle interface of floppy disk drives and, more particularly, to a self-compensating, expandable collet-type media centering and clamping mechanism for applying a relatively constant, predetermined clamping pressure to the flexible recording medium used in such a disk drive, even if the collet and spindle are slightly misaligned or if the mating surfaces of the collet and spindle are not absolutely flat or perfectly parallel.

BACKGROUND OF THE INVENTION

Rotating magnetic memories are becoming increasingly sophisticated to accomodate the growing need for reliable data storage and retrieval. So-called flexible or "floppy" disk drives are still in great demand, but there is mounting pressure to improve their performance and reliability while reducing their manufacturing cost.

As is known, floppy disk drives employ a disk-shaped, centrally apertured, compliant magnetic recording medium which conventionally is housed for rotation within a protective envelope or jacket, so that there is minimal direct contact with the recording medium as it is being inserted into and removed from the disk drive or otherwise being handled. The jacket, in turn, has several strategically located openings for exposing the recording medium, including a centrally located aperture so that the recording medium or "disk" can be centered on and clamped to a rotatably driven spindle, and at least one radially elongated slot to enable a recording head to access the disk for writing data on and reading data from anyone of a plurality of concentric tracks.

Substantial effort and expense have been devoted to designing media centering and clamping mechanisms for floppy disk drives. High performance floppy disk drives require precise centering of the recording medium with respect to the spindle to avoid unacceptable "off-track errors" and positive, non-slip clamping of the recording medium to the spindle to avoid unacceptable "bit time displacement errors" while data is being stored (i.e., "written") or retrieved (i. e., "read"). Furthermore, the disk centering and clamping action need not only be repeatable by a single disk drive, but also replicatable by other disk drives because data recorded by one disk drive is often read out by another. Indeed, one of the basic advantages of floppy disk drives is that the recording medium is removeable, whereby data may be easily "transported" from one drive to another.

Expandible collet-type disk centering and clamping mechanisms have been especially well received and are widely utilized in modern floppy disk drives. They characteristically require that the spindle have a central cylinderical bore or recess for receiving a positioning cone or collet having a generally circular arry of flexible fingers. In operation, the fingers radially expand against the inner edge of the central aperture in the recording medium while the collet is being seated within the spindle bore, thereby centering the recording medium or disk on the spindle. Examples of this type of clamping mechanism can be found in U.S. Pat. Nos. 4,125,883, 4,193,101, 4,409,629, 4,413,294 and 4,430,678. Typically, the collet is plastic and is designed so that its fingers resiliently deform whenever any force great enough to cause unwanted crimping or bending of the recording medium is applied thereto, thereby protecting the recording medium from being damaged. Furthermore, provision is usually made to ensure that little, if any, clamping pressure is applied to the recording medium until it is centered on the spindle. To that end, the clamping pressure conventionally is furnished by flanges which extend outwardly from the fingers of the collet to clamp the recording medium against an annular rim or face of the spindle only when the collet is substantially fully seated within the spindle bore.

The disk centering action of these expandable collet-type mechanisms usually is quite precise and readily repeatable. Unfortunately, however, their clamping action tends to be very sensitive to minor variations in the tilt of the collet relative to the spindle and to minor variations in the relative parallelism and flatness of the mating surfaces of the collet and spindle. Indeed, the ordinary manufacturing tolerances required to accomodate available, low cost, mass production techniques generally are sufficient to affect the clamping pressure provided by such mechanisms. Thus, the known expandible collet-type disk centering and clamping mechanisms have not fully satisfied the need for a low cost, readily replicatable clamp for repeatedly and positively clamping recording media in floppy disk drives.

SUMMARY OF THE INVENTION

In accordance with the present invention, an expandible collet comprising a plurality of flexible fingers for centering a recording disk on the spindle of a floppy disk drive has a generally tangentially extending, arcuately profile rib on each of its fingers for clamping the disk against the spindle. Due to the flexibility of the fingers, the ribs provide a substantially constant, line-like footprint for clamping the disk to the spindle, thereby maintaining a predetermined, essentially constnan, normal clamping pressure on the disk, even if the collet is slighted tilted with respect to the spindle or if the mating surfaces of the collet and spindle are not absolutely parallel or perfectly flat.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with reference to a particular embodiment, it is to be understood that there is no intent to limit it to that embodiment. On the contrary, the aim is to cover all modifications, alternatives and equivalents falling within the spirit and scope of the invention as defined by the appended claims.

Figure 1:
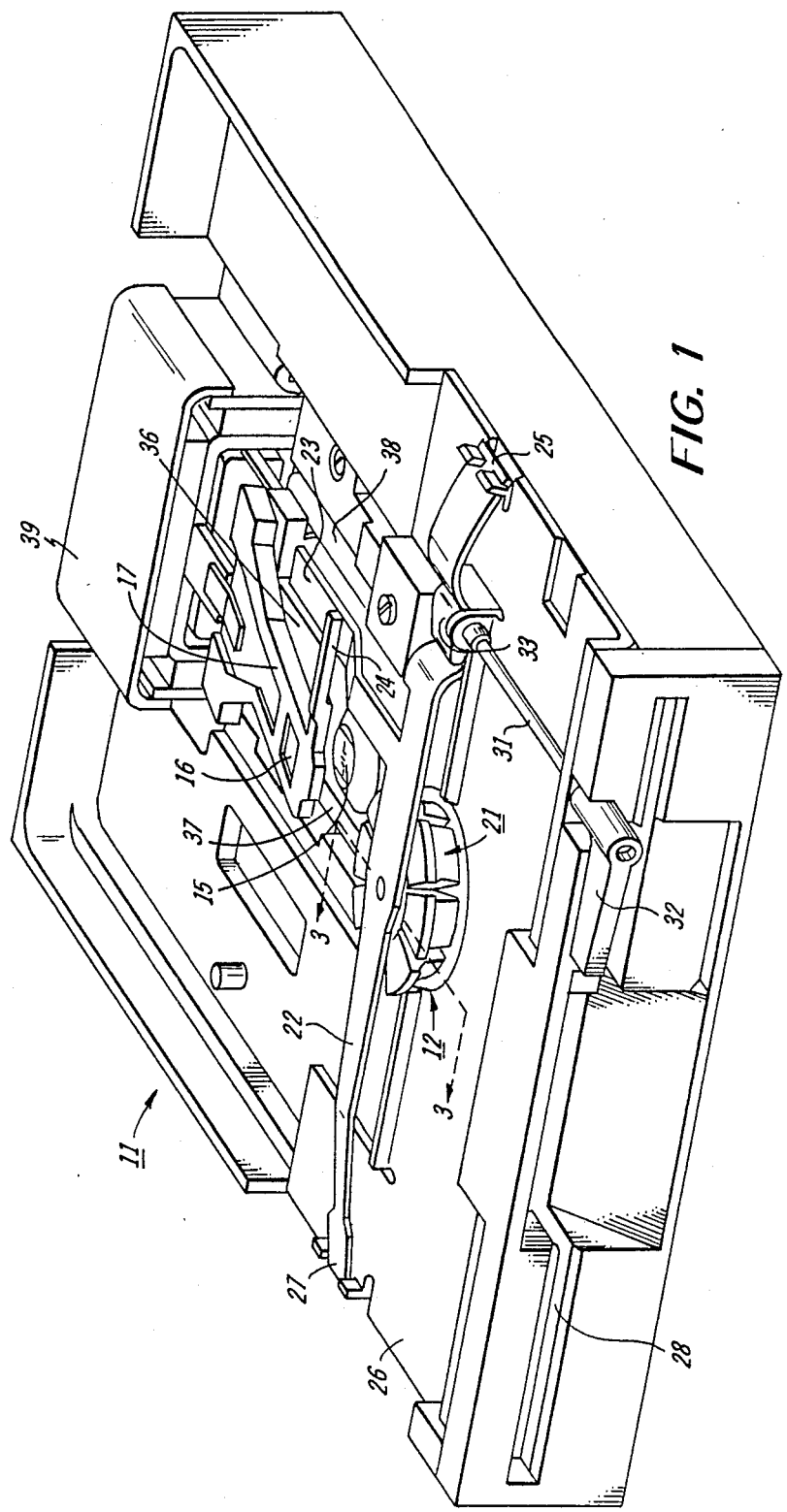
FIG. 1 is a simplified perspective view of a typical floppy disk drive having an expandable collet-type disk centering and clamping mechanism constructed in accordance with the present invention.

Turning now to the drawings, and at this point especially to FIG. 1, there is a floppy disk drive 11 (shown only in relevant part) having an expandible collet-type disk centering and clamping mechanism 12 for concentrically positioning and clamping a compliant magnetic recording medium 13 on a rotatably driven spindle 14 (see FIG. 2), thereby causing the recording medium 13 to rotate while data is being written thereon or read therefrom by either one of a pair of opposed magnetic recording heads 15 and 16. While the line of sight to the moveable side-1 head 16 is somewhat obstructed, it will be understood that the head 16 is mounted on a pivotally supported load arm 17 for swinging movement toward and away from the fixed side-0 head 15, so that data may be written on and read from either side of the recording medium 13. See, for example, U.S. Pat. No. 4,151,473, which issued Apr. 24, 1979 on a "Magnetic Recording Device for Double Sided Media." Furthermore, even though a double sided disk drive is shown, it will be evident that the present invention is equally applicable to single sided drives.

In keeping with accepted practices, the recording medium 13 is inserted into and removed from the disk drive 11 while the disk centering and clamping mechanism 12 is disengaged and while the heads 15 and 16 are unloaded. To that end, the collet 21 of the disk centering and clamping mechanism 12 is suspended from a bowed leaf spring 22, and a lifter arm 23 projects from the leaf spring 22 into underlying relationship with a tab 24 which extends from the head load arm 17. The leaf spring 22 has one end pivotally mounted, as at 25, on the housing 26 of the disk drive 11 and its opposite end guided, as at 27, for sliding movement relative to the housing 26. In the absence of any external force, the bow of the leaf spring 22 is sufficient to fully disengage the collet 21 from the spindle 14 (FIG. 2) and to lift the load arm 17 so that the moveable head 16 is spaced apart from the fixed head 15. Thus, the recording medium 13 (FIG. 2) may be inserted into and removed from the drive 11 via a conventional media access slot 28, without encountering any significant interference by the spindle 14, the collet 21, or the heads 15 and 16.

To enable the user to engage the clamping mechanism 12 and load the heads 15 and 16 or to disengage the clamping mechanism 12 and unload the heads 15 and 16, there is a connecting rod 31 for coupling a manually operated lever 32 to an eccentric 33 which bears against the leaf spring 22. When the lever 31 is positioned as shown, the eccentric 33 applies relatively little force to the spring 22, so that the recording medium 13 then may be inserted or removed from the drive 11 as previously described. However, when the lever 33 is rotated approximately a quarter turn in a counterclockwise direction, the eccentric 31 rotates a like amount such that it then supplies sufficient force to counteract the bow of the leaf spring 22, thereby loading the collet 21 against the spindle 14 to engage the clamping mechanism 12 while allowing the heads 15 and 16 to load into data transferring relationship with the recording medium 13. See, U.S. Pat. No. 4,193,101, which issued Mar. 11, 1980 on a "Collet Loading Mechanism" embodying similar principles.

Another more or less conventional feature of the disk drive 11 is that the heads 15 and 16 are supported on a carriage 36 which is mounted for sliding movement on a pair of generally parallel guide rods 37 and 38, so that a suitable actuator, such as a linear voice coil motor 39, may move the carriage 16 forward and back on the guide rods 37 and 38 as required to radially align the heads 15 or 16 with any selected one of a plurality of concentric tracks on side-0 or side-1, respectively of the recording medium 13. Typically, the clamping mechanism 12 is engaged and the heads 15 and 16 are loaded against the recording medium 13 before the actuator 39 is energized to execute any such "seek command."

Figure 2:
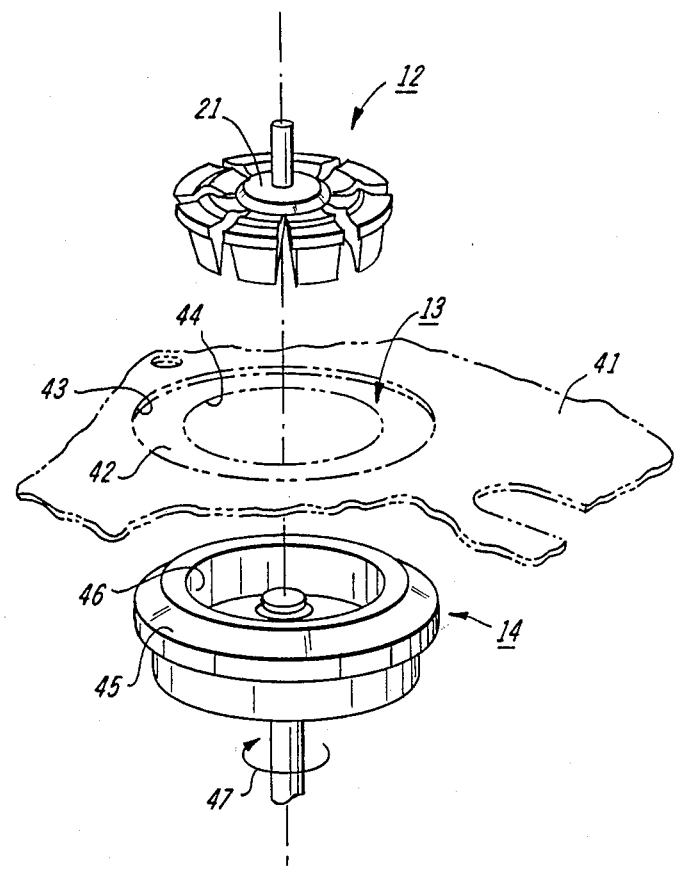
FIG. 2 is an enlarged, fragmentary perspective view which schematically illustrates the disk centering and clamping mechanism in additional detail.

As shown in some additional detail in FIG. 2, the recording medium 13 is roughly aligned (by means not shown) while being inserted into the disk drive 11 (FIG. 1) so that it is positioned, as shown in phantom lines, to be sequentially centered on and clamped to the the spindle 14 while the collet 21 is being "loaded" (i. e., brought into engagement with the spindle 14). In keeping with standard practices, the recording medium 13 is a centrally apertured, compliant disk which is housed for rotation within a centrally apertured protective envelope 41. An inner annular segment 42 of the recording medium or disk 13 is exposed because the central aperture 43 of the envelope 41 has a somewhat larger diameter than the central aperture 44 of the disk 13. The spindle 14, in turn, has an annular rim 45 surrounding a carefully machined or otherwise precisely dimensioned central bore 46 having a diameter which is essentially equal to the diameter of the disk aperture 44, whereby the exposed disk segment 42 aligns with the spindle rim 45 when the disk 13 is properly centered on the spindle 14 as subsequently described. While data is being written on or read from the disk 13, the spindle 14 is rotated (by means not shown), at a predetermined, constant velocity, such as 360 rpm, in the direction of the arrow 47.

Figure 3:
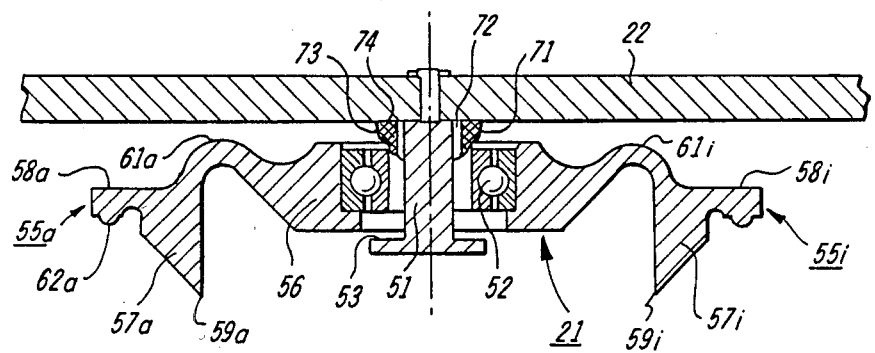
FIG. 3 is an enlarged, fragmentary sectional view taken along the line 3—3 in FIG. 1 to illustrate the expandable collet of the disk centering and clamping mechanism in still further detail.

Referring to FIG. 3, it will be seen that the collet 21 is suspended from the leaf spring 22 on a central support shaft 51 and is journalled for rotation about the shaft 51 by an annular ball bearing 52. There is a radial clearance between the support shaft 51 and the bearing 52, so that the collet 21 may shift radially with respect to the shaft 51 as required to concentrically align with the spindle 14. Thus, the free end of the support shaft 51 is terminated by a relatively large diameter flange 53 to retain the collet 21.

Figure 4:
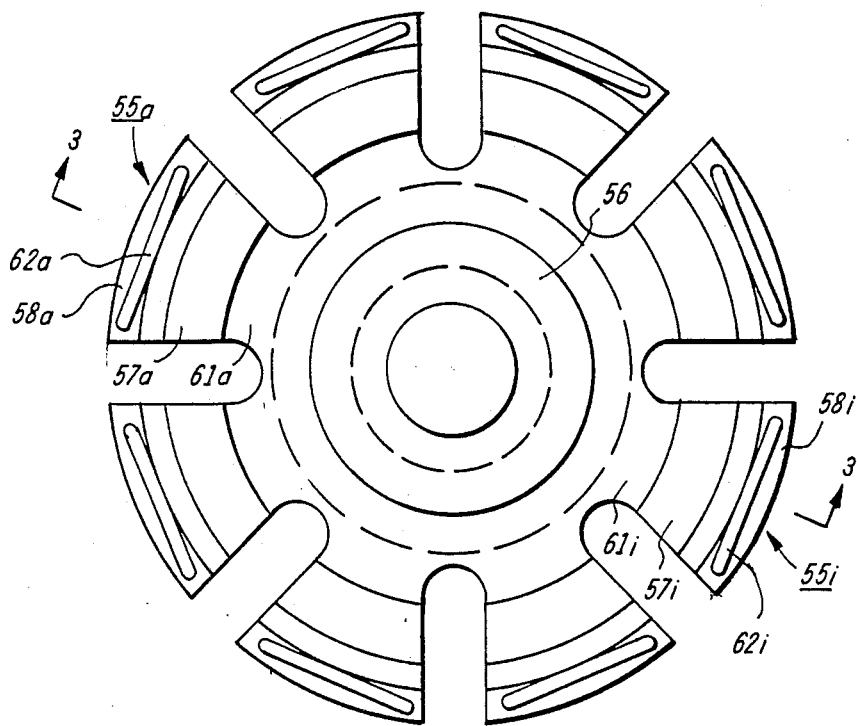
FIG. 4 is an enlarged plan view of spindle/media interface provided by the collet.

As best shown in FIGS. 3 and 4, the collet 21 conventionally has an inverted cup-like configuration and is segmented at regular angular intervals so that it has a plurality of flexible fingers 55a-55i extending radially from its base 56. For centering a disk 13 on the spindle 14, there are wedge-shaped legs 57a-57i extending axially from the fingers 55a-55i, respectively. Furthermore, for clamping the centered disk 13 to the spindle 14, there are radially extending flanges 58a-58i at the outer tips of the fingers 55a-55i, respectively, for distributing the load force supplied by the load spring 22 circumferentially of the spindle 14.

When the fingers 55a-55i are relaxed, the tips 59a-59i of the legs 57a-57i lie on a circle which has a substantially smaller diameter than the central aperture 44 of the disk 13. Thus, as can be visualized by referring to FIG. 2, they more or less freely pass through the disk aperture 44 and into the central bore 46 of the spindle 14. The wedging action of the legs 57a-57i gently and progressively centers the disk 13 as the collet 21 is being seated on the spindle 14, even before the fingers 55a-55i start to radially expand.

More particularly, as illustrated, the fingers 55a-55i have relatively thin, arcuately buckled segments 61a-61i inboard of the legs 57a-57i, respectively, which resiliently deform when the disk centering legs 57a-57i and/or the clamping flanges 58a-58i make contact with the spindle 14, thereby causing the fingers 55a-55i to radially expand so that the disk 13 is precisely centered on the spindle 14. Of course, no substantial clamping pressure is applied to the disk 13 until the fingers 55a-55i have expanded sufficiently to seat the legs 57a-57i firmly against the sidewall of the spindle bore 46 because the deformable segments 61a-61i continue to yield in the absence of such resistance to further radial expansion of the fingers 55a-55i.

In accordance with the present invention, there are generally tangentially extending, arcuately profiled ribs 62a-62i on the flanges 58a-58i, respectively, for clamping the disk 13 (FIG. 2) to the spindle 14. After the disk 13 has been properly centered on the spindle 14, the ribs 62a-62i urge the exposed inner annular segment 42 of the disk 13 into pressure contact with the annular rim 45 of the spindle 14, thereby causing the disk 13 to rotate with the spindle 14. Due to the flexibility of the fingers 55a-55i there is an effective line contact between the ribs 62a-62i and the disk 13 while the collet 21 is fully seated on the spindle 14, even if the axes of the spindle 14 and collet 21 are not absolutely collinear or if the clamping flanges 58a-58i and the spindle rim 45 are not perfectly flat and parallel. That ensures that the clamping pressure applied to the disk 13 is substantially independent of the usual manufacturing tolerances. Preferably, the ribs 62a-62i are profiled to have a substantially constant radius so that the contact area between the ribs 62a-62i and the disk 13 is essentially unaffected by the flexing of the fingers 55a-55i. That, of course, minimizes the variations in the clamping pressure applied by the ribs 62a-62i, whereby the clamping pressure may be preselected as required for optimum non-slip clamping of the disk 13 to the spindle 14.

As described in more detail in a concurrently filed and commonly assigned United States patent application of David R. Sheriff on a "Floating Collet Suspension for Floppy Disk Drives" (D/84075), there advantageously is a gimbal-like suspension for the collet 21 so that it is free to follow the inherent dynamic perturbations in the rotation of the spindle 14, such as may be caused by its radial or axial runout variations. To that end, as illustrated in FIG. 3, there is a hemispherical sleeve bearing 71 mounted on the collet support shaft 51 between the collet 21 and the load spring 22. A suitable radial clearance is provided between the central bore or sleeve 72 of the bearing 71 and the shaft 51, so that the bearing 71 may shift radially with respect to the shaft 51 while the collet 21 is centering itself on the spindle 14 (FIG. 2).

When the collet 21 is loaded against or engaged with the spindle 14, the spring 22 engages the planar base 73 of the bearing 71, thereby urging its hemispherical bearing surface 74 into contact with the adjacent inner shoulder of the collet journal bearing 52. Typically, the shoulder of the journal bearing 52 is chamfered, so that there is relatively little binding between the bearings 52 and 71. In effect, the bearing 71 forms a ball joint which allows the collet 22 to follow the dynamic perturbations of the spindle 14 with little, if any, resistance.

CONCLUSION

In view of the foregoing, it will now be understood that the present invention provides a relatively reliable and readily manufacturable media clamping mechanism for floppy disk drives. The ordinary manufacturing tolerances of the clamping mechanism have relatively little effect on the clamping pressure supplied thereby, with the result that a predetermined optimum clamping pressure may be repeatedly reproduced by clamping mechanisms for different disk drives. As will be appreciated, the invention may be embodied in an expandible collet-type media centering and clamping mechanism, but that is not absolutely essential to its successful implementation.

What is claimed is:

1. In a floppy disk drive having a rotatably driven spindle, and a collet with a plurality of flexible fingers for clamping recording media to said spindle; said collet having improved media engaging means comprising
   generally tangentially extending, arcuately profiled ribs
   each of said fingers supporting a respective one of said ribs, whereby said collet has a substantially constant line-like contact ara for maintaining a preselected clamping pressure on said media despite any tolerance permitted imperfection of said collet spindle.

2. The improvement of claim 1 wherein said ribs have substantially constant radius profiles, such that the contact area of said collet and the clamping pressure applied to said media are essentially independent of any flexing required of said fingers to mate with said spindle.

3. The improvement of claim 1 wherein
   said recording media is a disk having a central aperture of predetermined diameter,
   said spindle has an annular rim ringing a central bore, said bore being of essentially the same diameter as the central aperture of said disk,
   said collet is suspended for rotation substantially coaxially with said spindle and is mounted for movement toward and away from said spindle for loading and unloading, respectively, of said collet,
   said fingers extend radially and are radially expandable, said fingers having legs extending axially therefrom for centering said disk on said spindle and flanges extending radially therefrom for supporting said ribs, and
   said fingers radially expand as said collet is being loaded against said spindle, whereby said legs first center said disk on said spindle and said ribs then clamp said disk against the rim of said spindle.

4. The improvement of claim 3 wherein said ribs have substantially constant radius profiles, such that the contact area of said collet and the clamping pressure applied to said media are essentially independent of any flexing required of said fingers to load said collet against said spindle.

* * * * *